United States Patent [19]
Pullman

[11] Patent Number: 5,718,498
[45] Date of Patent: Feb. 17, 1998

[54] FLASHLIGHT AND ILLUMINATING PANEL

[76] Inventor: Burke C. Pullman, 390 Vereda Sur, Palm Springs, Calif. 92262

[21] Appl. No.: 740,563

[22] Filed: Oct. 30, 1996

[51] Int. Cl.$^6$ .................................................. F21V 7/04
[52] U.S. Cl. .............................. 362/31; 362/135; 362/200
[58] Field of Search ................................... 362/135, 200, 362/31

[56] References Cited

U.S. PATENT DOCUMENTS

| | | | |
|---|---|---|---|
| 2,529,713 | 11/1950 | Thurston | 362/31 |
| 4,091,443 | 5/1978 | Ohrenstein et al. | 362/31 |
| 4,739,455 | 4/1988 | Pullman | 362/200 |
| 4,885,666 | 12/1989 | Yu | 362/200 |
| 5,568,965 | 10/1996 | Eagan | 362/135 |

*Primary Examiner*—Carroll B. Dority

[57] ABSTRACT

The invention provides a flashlight unit having a usual casing with a light bulb mounted in the casing in position to project light out through the forward end of the casing in a normal manner. In accordance with the invention, the unit also includes an illuminating member having a panel section mounted to be visible through the top side of the casing and also having a second integral section extending around the neck of the light bulb for directing side light into the panel section. In one embodiment, the panel section includes a diffraction grating for directing light perpendicular to the plane of the panel section to illuminate external objects. In the first embodiment, a planar mirror member is mounted on the top side of the casing adjacent to the panel section of the illuminating member and in co-planar relationship therewith in position to reflect objects illuminated by the illuminating member. In the first embodiment means may be provided for removably holding tubular lipstick containers or other vanity items in the casing. In a second embodiment, the panel section of the illuminating member extends across the top side of the casing, and serves to illuminate pictorial or other representations formed on a substrate mounted either over or under the panel. The panel member in the second embodiment may be suitably etched to provide sparkling highlights for the graphic or pictorial representations on the substrate.

10 Claims, 5 Drawing Sheets

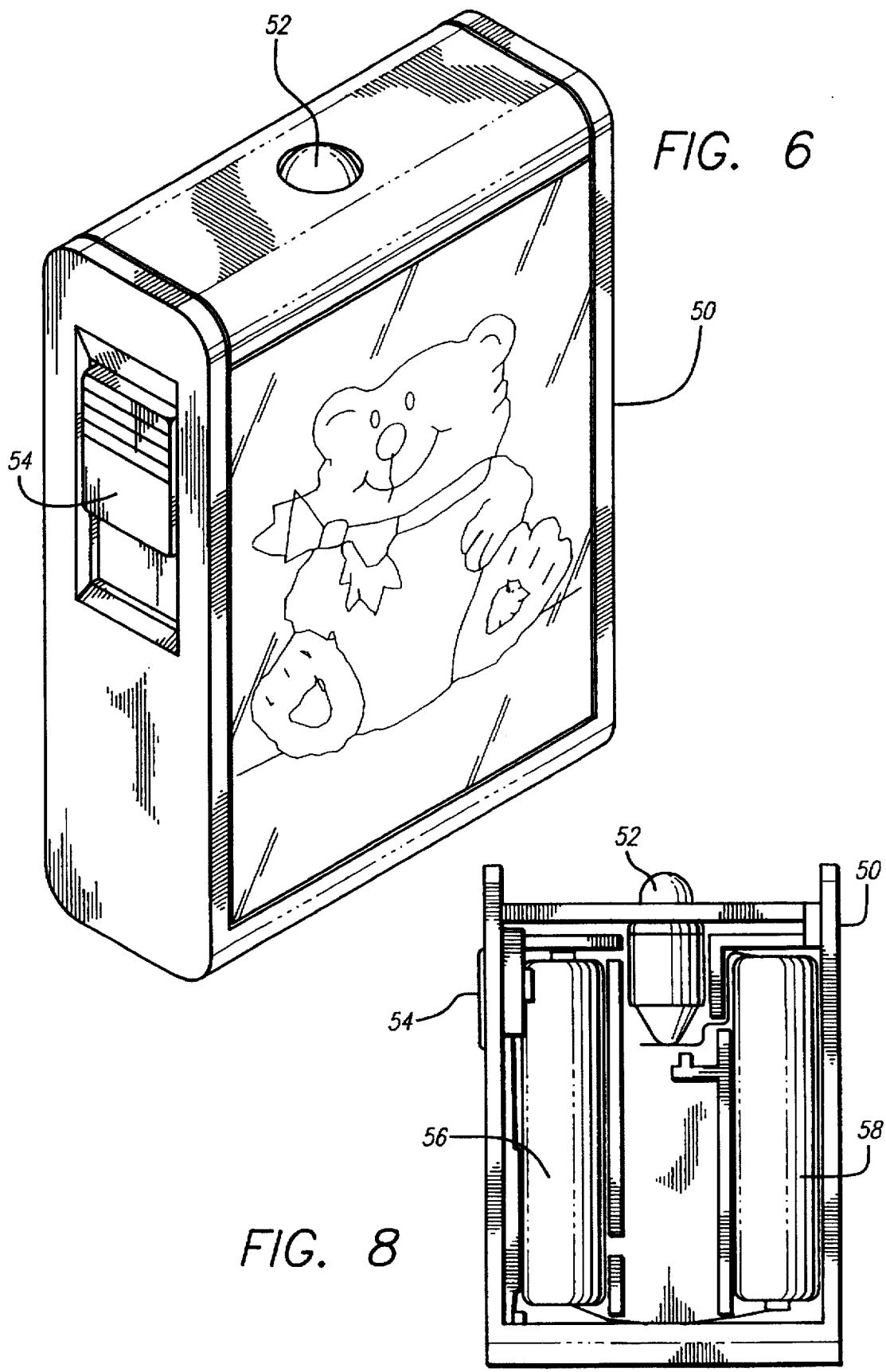

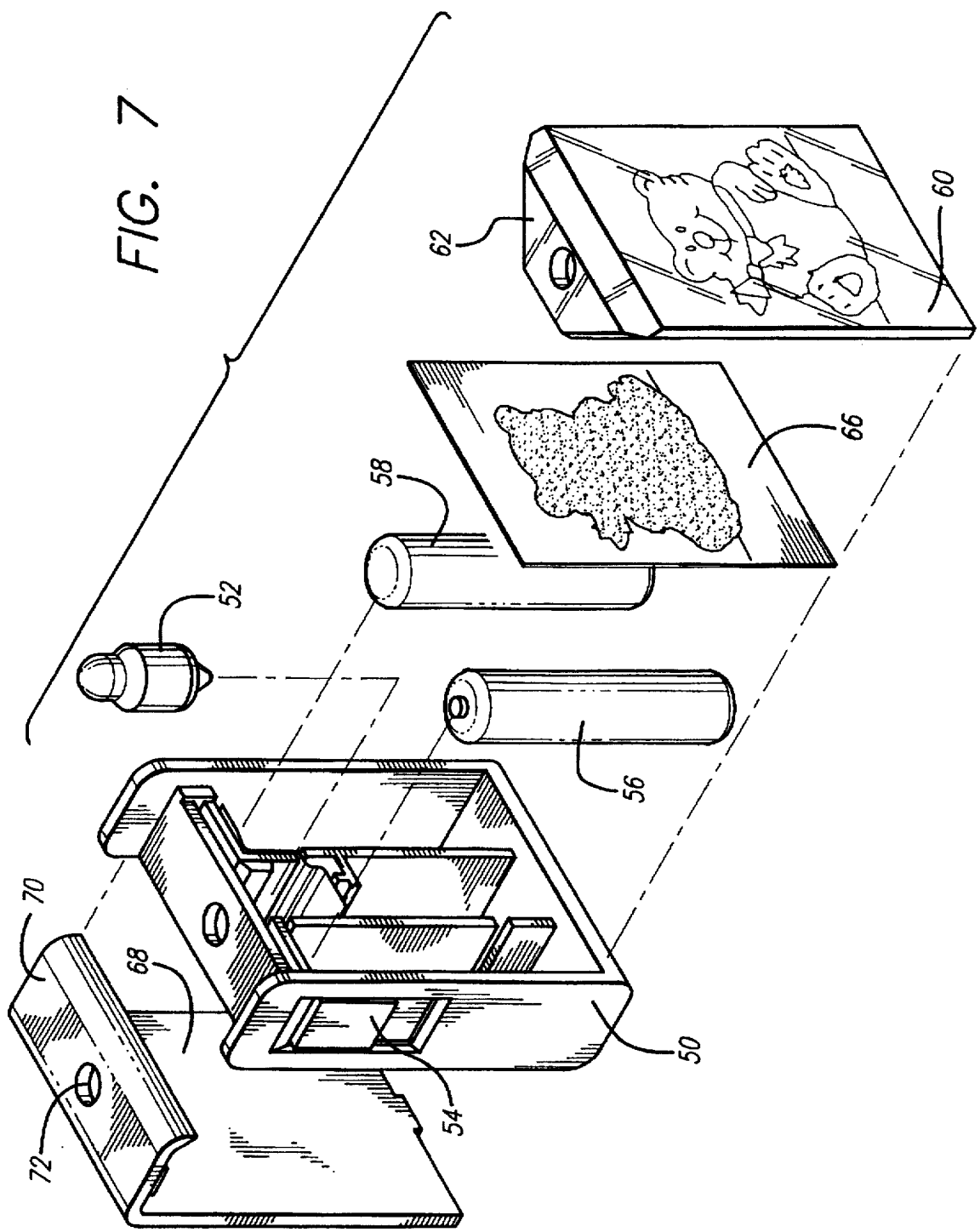

FLASHLIGHT AND ILLUMINATING PANEL

BACKGROUND OF THE INVENTION

The invention is concerned with an improved miniature flashlight in which a light bulb directs light in a forward direction through one end of a casing and which, in accordance with the invention, also includes a transparent illuminating panel which acts as a light conductor and which includes a section which encompasses the neck of the light bulb to capture normally unused side light from the light bulb and direct the side light into the interior of the panel for illuminating purposes. This is achieved without compromising in any way the forward illumination of the flashlight.

The concept of the present invention represents a departure from the usual prior art flashlight in which primary consideration is given to providing maximum illumination in the forward direction only.

In a first embodiment of the invention, a diffraction grating is included in the illuminating panel, and this grating serves to direct the side light from the light bulb upwardly out of the plane of the panel to illuminate, for example, the face of a person looking down at the panel.

The first embodiment of the invention will be described in conjunction with a flashlight case in which an illuminating panel is mounted on one surface of the unit and a planar mirror is also mounted on the same surface of the casing adjacent to the illuminating panel. The illuminating panel then serves to illuminate the face of the user as seen in the mirror.

The first embodiment of the invention will be described herein as being shaped to have the ability to securely retain a lipstick container, or other vanity items, such as receptacles for contact lenses, perfume bottles, and the like, on the sides of the case.

In a second embodiment of the invention, the section of the illuminating panel is shaped to encompass all or part of the neck of the light bulb, thereby directing the normally unused side light from the bulb into the illuminating panel itself where it is contained within the plane of the illuminating panel. The light captured in this manner, together with the inherent light transmitting characteristics of the illuminating panel, enables the light to be directed within the plane of the illuminating panel. In the second embodiment, the illuminating panel is mounted to extend over one or more surfaces of the flashlight. When the flashlight is turned on, graphics placed under the illuminating panel are illuminated and any etchings within the plane of the illuminating panel are emphasized. In this way, special attention can be called to specific logos, designs, etc.

Accordingly, a feature of the unit of the present invention resides in the fact that side light is captured from a flashlight bulb simultaneously to illuminate a transparent illuminating panel, this being achieved without detracting in any way from the intended primary purpose of the light bulb's illuminating capabilities in the forward direction.

BRIEF DESCRIPTION OF THE DRAWINGS

FIG. 6 is a perspective view of a flashlight unit constructed in accordance with a second embodiment of the invention taken from above and to one side of the unit;

FIG. 7 is an exploded perspective view of the unit of FIG. 6 showing the various components which make up the unit; and FIG. 8 is a rear view of the unit of FIG. 6 with the rear cover removed to illustrate various internal components of the unit.

DETAILED DESCRIPTION OF ILLUSTRATED EMBODIMENTS

Figure 1:
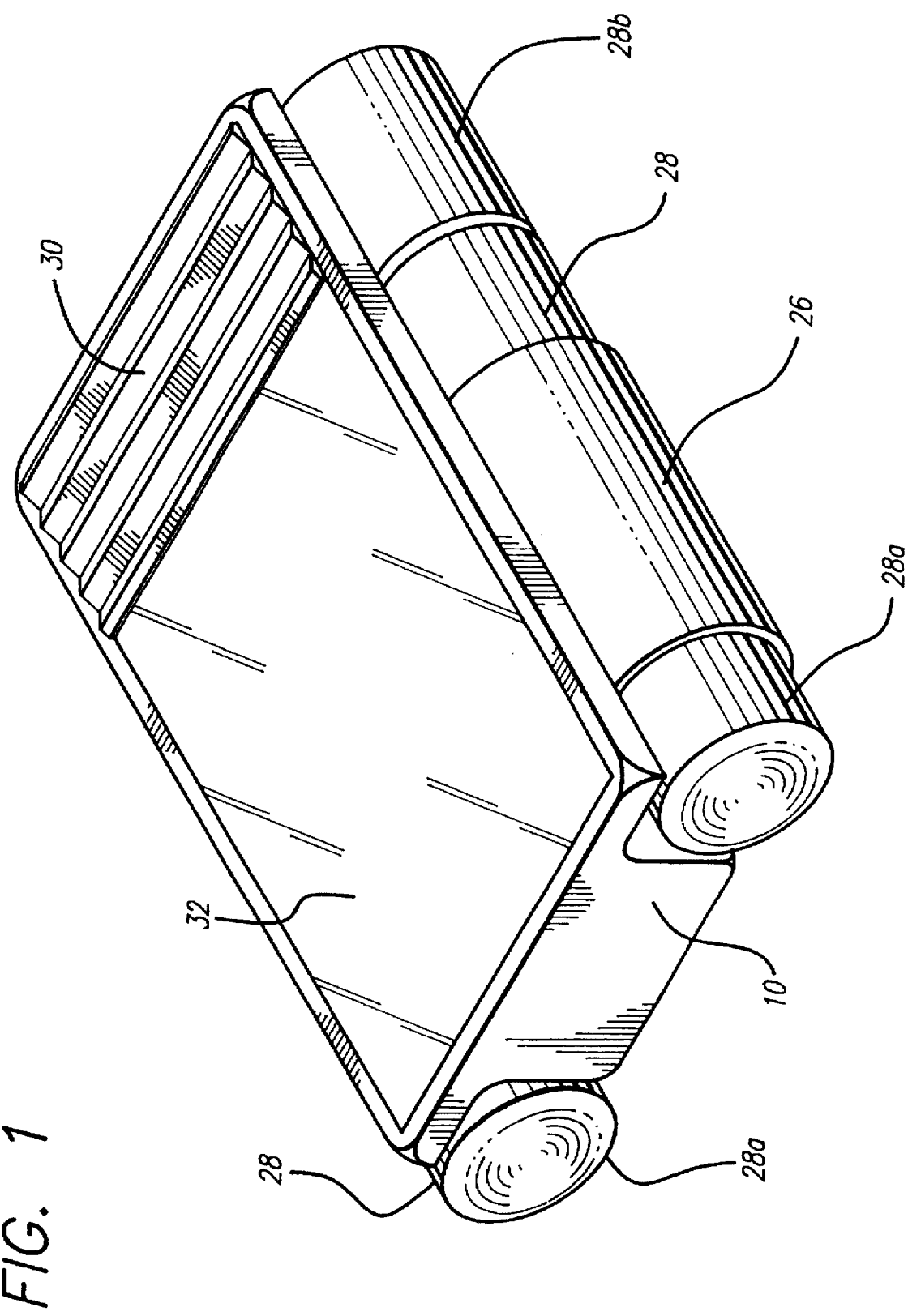
FIG. 1 is a perspective representation of a flashlight unit constructed in accordance with one embodiment of the invention taken from above and to the rear of the unit.
Figure 4:
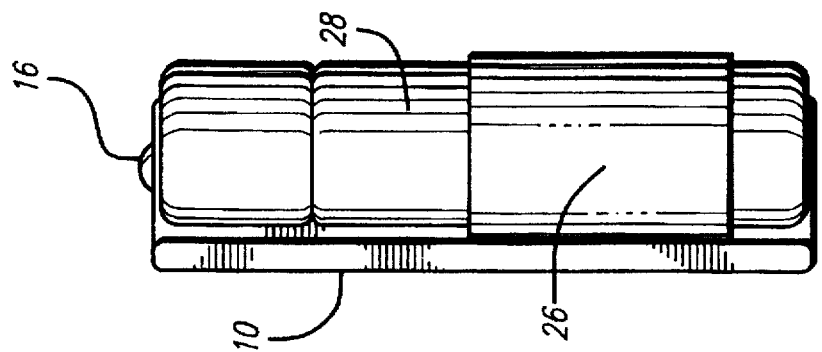
FIG. 4 is a side elevational view of the unit of FIG. 1.
Figure 2:
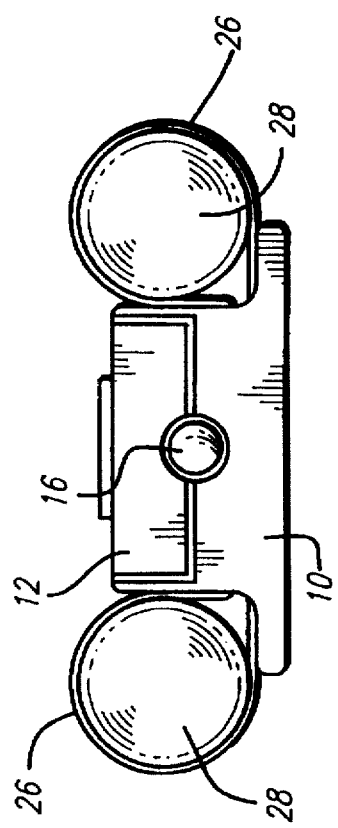
FIG. 2 is a front elevational view of the unit of FIG. 1.

The flashlight of the present invention in the embodiments shown in FIGS. 1–5 includes a rectangular main body casing 10 and a rectangular cover 12. In addition, the first embodiment may be shaped to have the ability to mount the casing 10 and cover 12 so as to form a compartment for a pair of batteries 14. The batteries 14 are interconnected by a flat resilient contact 20, and are connected to a light bulb 16 through a pair of resilient flat switch contacts 18a and 18b. The light bulb 16 is mounted in the casing in a manner enabling it to project light through a side of the main body casing. The switch contact 18a is operated by a switch actuator 22. A portion of the switch actuator extends through an aperture in cover 12 to enable the switch actuator to be manually moved between an "ON" position and an "OFF" position. Switch contact 18a is mounted to be normally in contact with the end contact of bulb 16. The switch actuator 22 has a pair of vertical legs, with a protrusion 22a being formed on the outer surface of one or both of the vertical legs. This protrusion engages contact 18a. When the switch actuator 22 is moved forward to its "OFF" position, it forces contact 18a away from the contact on the bulb and the flashlight is turned off. When the switch actuator 22 is moved in the opposite direction, the resilient contact 18a reassumes its position in contact with the lower terminal of the bulb. The protrusion 22a on the vertical leg of switch actuator 22 may be formed on both vertical legs of the switch actuator 22 to facilitate assembly, specifically, to permit the actuator to operate regardless of its orientation.

When the flashlight is turned on, light is emitted by light bulb 16 through an aperture in the main body casing 10. This enables the flashlight to be used for normal purposes, such as illuminating restaurant menus, key holes and the like.

One or more elastic webbing members 26 are secured to the main body 10 and extend through slots, such as slot 27, enabling containers such as lipstick containers 28 of any shape to be firmly retained against the side of the main body casing 10. Although the illustration shows the elastic webbing members 26 to be independent of the main body 10, it is to be understood that such elastic members could be an integral part of the main body casing 10. It is also to be understood that other extensible holding means could be used, such as clips or the like.

Figure 3:
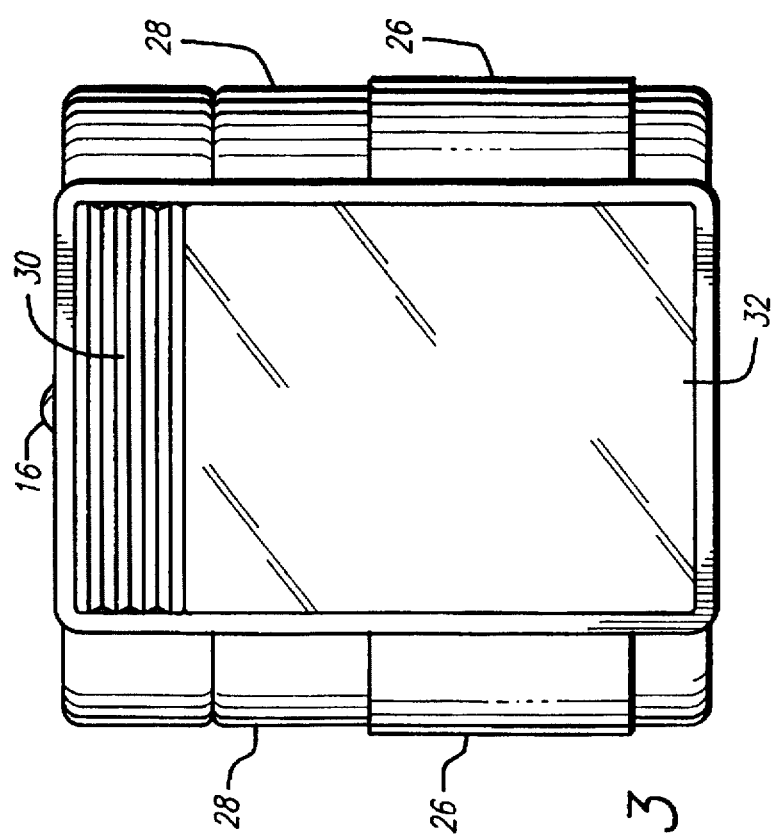
FIG. 3 is a top plan view of the unit of FIG. 1.

As illustrated, the main body casing 10 has a T-shaped cross-sectional configuration so that the lipstick containers 28 may be conveniently positioned in grooves along the sides of the main body casing, as best shown in FIGS. 1 and 3. The lipstick containers 28 each consists of an elongated cylindrical-shaped barrel member 28a and a second elongated member 28b which holds the actual lipstick container that extends into the corresponding barrel member 28a when the lipsticks are not in use. The elastic webbing members 26 are preferably positioned around the tubular barrel members 28a so that the members 28b may be pulled out from the barrel members 28a in order to apply the lipstick, without any need to remove the barrel members 28a from the casing itself. This minimizes any likelihood of the barrel members being dropped and misplaced during the application of the lipstick.

Figure 5:
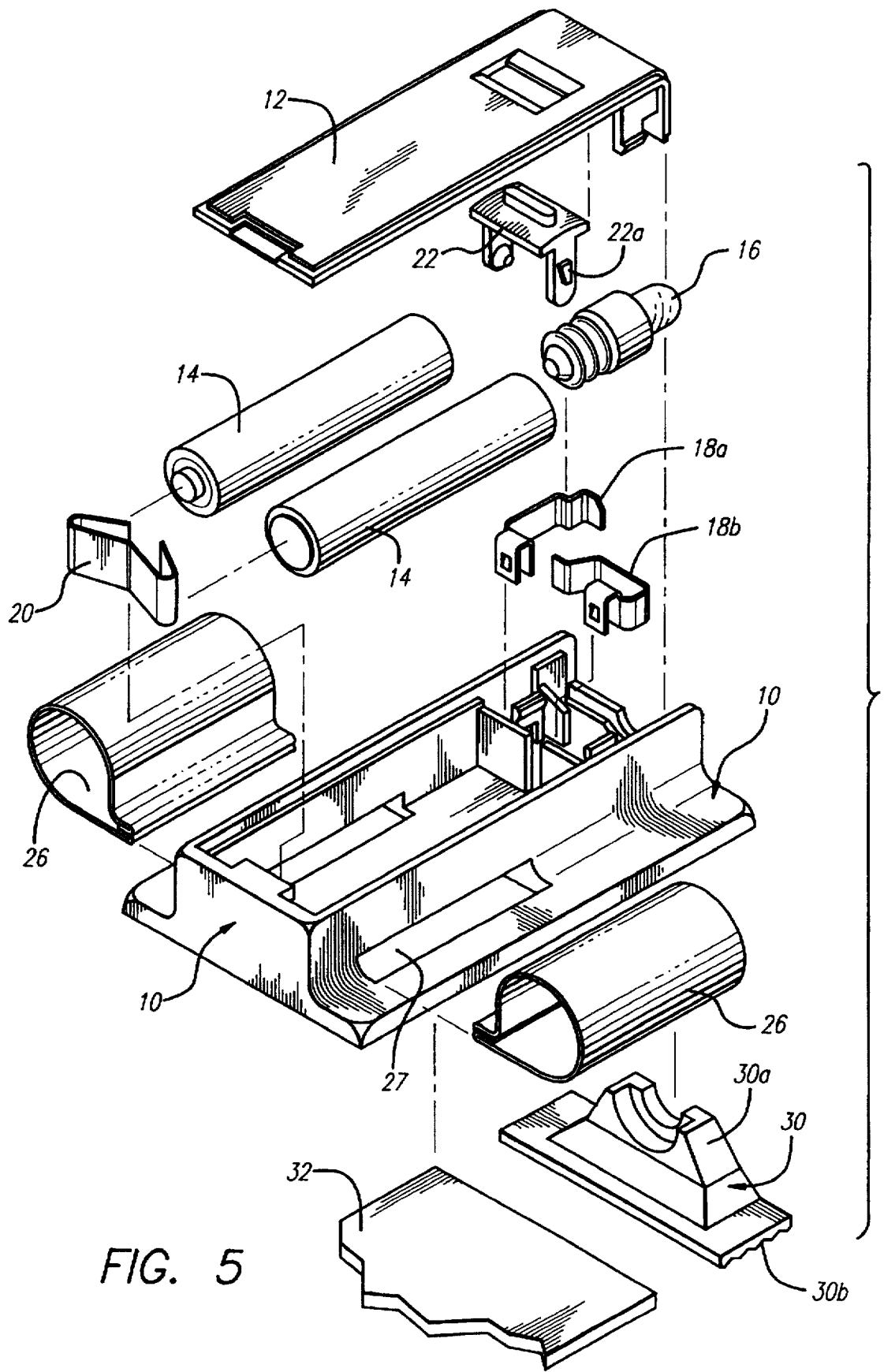
FIG. 5 is an exploded perspective view of the unit showing the various components which make up the unit.

An illuminating panel 30 is mounted in the main body casing. The illuminating panel 30 may be formed of acrylic plastic or other appropriate transparent material. The illuminating panel 30 includes a molded plastic collar 30a (FIG. 5) which fits on the neck of the light bulb 16 allowing it to capture the unused side light emitted from the light bulb. The illuminating panel also includes a planar section 30b whose underside is formed in a sawtooth configuration, as shown in FIG. 5, which acts as a diffraction grating and enables the captured light to be diffused at essentially right angles to the upper surface of the panel 30. The angle of the sawtooth is selected for maximum effectiveness.

As best shown in FIG. 1, the illuminating panel 30 is mounted at one end of main body casing 10, and a planar mirror 32 is also mounted on the same surface adjacent and in co-planar relationship with the illuminating panel. Accordingly, light emitted from the illuminating panel 30 is directed upwardly toward the face of a user holding the unit so that the user's face may be illuminated and readily visible in mirror 32.

The second embodiment of the invention, as shown in FIGS. 6, 7 and 8, consists of a flashlight having a case 50. A light bulb 52 is mounted in the case 50 to emit illuminating light through an aperture of the case. A switch actuator 54 is mounted in the case and extends through one side of the case to enable the user to turn the flashlight on and off. As shown in FIG. 8, a pair of batteries 56 and 58 are supported within the case 50 and are appropriately connected to the light bulb 52 through a switch 56 which is operated by the switch actuator 54.

The unit includes a transparent illuminating panel 60 which may be formed of acrylic plastic, or other appropriate transparent material. The illuminating panel 60 has an end section 62 which is integral with the panel 60 and extends at right angles to the plane of the panel. An aperture is formed in the end section 62, and the light bulb 52 extends through the Accordingly, the end section 62 of the illuminating panel encompasses the side of the light bulb 52 and causes side light from the light bulb to be conducted to the main panel 60. The main panel 60 is thus edge-lighted and becomes illuminated. A pictorial representation 66, or other representation, is provided on a separate substrate and is placed on the top of the casing 50 under the illuminating panel 60.

The unit also includes a rear cover 68 which is slidably mounted on the back of the casing and which includes a projecting portion 70 which extends at right angles to the plane of the cover 68 and over the section 62 of the illuminating panel 60. The end section 70 of the cover 68 has an aperture 72 which receives the light bulb 52. The cover 68 serves to hold all the parts illustrated in FIG. 7 in an assembled position. The illuminating panel 60, end section 62 and rear cover assembly 68, 70 and 72 may be fabricated as a single unit. In such a case, rear cover assembly 68 may also act as an illuminating panel if so desired.

When the flashlight is turned on, the light bulb 52 emits a normal flashlight beam through an aperture of the casing for usual illumination purposes. In addition, the side light from the light bulb is used to illuminate the illuminating panel 60, as described above, thereby illuminating the pictorial design or graphic representation. The panel may be etched with etchings corresponding to features of the pictorial design which serve to highlight the pictorial design and draw attention to the etching.

The invention provides, therefore, a simple and economical unit which may function as a normal miniature flashlight and which also provides additional illumination derived from the side light emitted by the flashlight bulb.

It will be appreciated that while particular embodiments of the invention have been shown and described, modifications may be made. It is intended in the claims to cover all modifications which come within the true spirit and scope of the invention.

I claim:

1. In combination: a casing having first and second surfaces essentially perpendicular to one another; means for supporting a light bulb within the casing in position to project a light beam out through said first surface; said light bulb having a transparent globe and metal base section; a transparent illuminating member mounted on said casing adjacent to said light bulb and having a first section encompassing a portion of the globe of said light bulb and having a panel section optically coupled to said first section and extending parallel to said second surface for receiving side light from said light bulb through said first section.

2. The combination defined in claim 1, in which said panel section of said member includes a diffraction grating for directing light from said first section at an angle to the plane of said panel section.

3. The combination defined in claim 2, and which includes a planar mirror member mounted on the second surface of said casing in essentially co-planar relationship with the panel section of said illuminating member in position to reflect objects illuminated by said illuminating member.

4. The combination defined in claim 3, in which said casing has a T-shaped cross-sectional configuration to define first and second grooves extending along respective ones of said first and second edges; and means for removably supporting selected items in respective ones of said grooves.

5. The combination defined in claim 4, in which said supporting means each comprises an elastic webbing member secured to or integral with said casing and looped around selected ones of said items.

6. The combination defined in claim 3, and which includes means for removably supporting at least one lipstick holder, or the like, in position on said casing.

7. The combination defined in claim 6, in which said supporting means comprises an elastic webbing member secured to said casing which may be looped around said lipstick holder or containers of any shape.

8. The combination defined in claim 7, in which said lipstick holder comprises an elongated barrel member and an elongated lipstick supporting member coaxially mounted on said barrel member, and in which said elastic member is positioned to extend around said barrel member to permit independent removal of said lipstick supporting member.

9. The combination defined in claim 1, and which includes a substrate bearing a graphic or pictorial representation mounted adjacent to said panel section of said illuminating member to be illuminated by said illuminating member.

10. The combination defined in claim 9, in which said panel section of said illuminating member has etchings formed therein to highlight the graphic or pictorial representation.

* * * * *